(12) United States Patent
Chao

(10) Patent No.: US 7,530,770 B2
(45) Date of Patent: May 12, 2009

(54) DOOR LOCKSET MOUNTING TOOL

(76) Inventor: Walley Chao, 3F, No. 157, Sec. 1, Mei Tsun Rd., Taichung (TW)

( * ) Notice: Subject to any disclaimer, the term of this patent is extended or adjusted under 35 U.S.C. 154(b) by 217 days.

(21) Appl. No.: 11/392,609

(22) Filed: Mar. 30, 2006

(65) Prior Publication Data
US 2007/0110528 A1 May 17, 2007

(30) Foreign Application Priority Data
Nov. 16, 2005 (TW) ............... 94219863 U

(51) Int. Cl.
B23B 47/28 (2006.01)
(52) U.S. Cl. ............ 408/115 R; 408/103; 408/241 G
(58) Field of Classification Search ........... 408/72 R, 408/103, 115 B, 115 R, 241 B, 241 G; B23B 47/28
See application file for complete search history.

(56) References Cited

U.S. PATENT DOCUMENTS

| | | | | |
|---|---|---|---|---|
| 3,053,121 | A | * | 9/1962 | Proctor ............... 408/108 |
| 3,313,188 | A | * | 4/1967 | Abernethy ............. 408/97 |
| 4,280,776 | A | | 7/1981 | Chaconas et al. |
| 4,306,823 | A | * | 12/1981 | Nashlund .............. 408/26 |
| 4,474,514 | A | * | 10/1984 | Jensen ............... 408/115 R |
| 4,522,539 | A | * | 6/1985 | Gibbs ............... 408/72 R |
| 4,715,125 | A | * | 12/1987 | Livick ............... 33/197 |
| 4,809,424 | A | * | 3/1989 | Bianchi et al. ......... 29/564.2 |
| 4,813,826 | A | * | 3/1989 | Riedel ............... 408/108 |
| 5,222,845 | A | * | 6/1993 | Goldstein et al. ........ 408/103 |
| 5,407,307 | A | * | 4/1995 | Park ................ 408/115 R |
| 5,466,098 | A | * | 11/1995 | Juang ............... 408/115 R |
| 5,569,001 | A | * | 10/1996 | Brutscher et al. ....... 408/115 R |
| 6,193,449 | B1 | * | 2/2001 | Diaz ............... 408/115 R |
| D516,401 | S | * | 3/2006 | Snider et al. ......... D8/71 |
| 7,073,991 | B2 | * | 7/2006 | Thomas ............. 408/115 R |
| 7,112,014 | B2 | * | 9/2006 | Thomas ............. 408/1 R |
| 7,210,880 | B2 | * | 5/2007 | Snider et al. ......... 408/115 R |
| 2005/0220548 | A1 | * | 10/2005 | Thomas ............. 408/103 |

FOREIGN PATENT DOCUMENTS

GB 2203069 A * 10/1988

* cited by examiner

Primary Examiner—David P Bryant
Assistant Examiner—Eric A Gates
(74) Attorney, Agent, or Firm—Browdy and Neimark, P.L.L.C.

(57) ABSTRACT

A door lockset mounting tool includes a base body, which has a first plate member and a second plate member fixedly arranged at right angles, a first positioning hole defined in the first plate member, and a second positioning hole defined in the second plate member, a positioning mechanism, which is movably mounted in the first positioning hole of the base body for defining a first drilling center, and a positioning device, which is mounted in the second positioning hole for defining a second drilling center.

5 Claims, 7 Drawing Sheets

DOOR LOCKSET MOUNTING TOOL

BACKGROUND OF THE INVENTION

1. Field of the Invention

The present invention relates to joiner's tools and more particularly, to a door lockset mounting tool for guiding installation of a lockset in any of a variety of door panels.

2. Description of the Related Art

When a worker or user wishes to install a door lockset in a door panel, he/she may adhere a positioning sticker, which is contained in the purchased door lockset, to the door panel, and then defines the front drilling center and the side drilling center subject to the marks at the positioning sticker, and then use a drill to drill holes on the door panel for mounting the door lockset. This positioning sticker is easy to use. However, inaccurate positioning of the positioning sticker on the door panel may affect the performance of the installed door lockset. Further, the side hole mark on the positioning sticker is not adjustable subject to different door panels having a different thickness.

There is also known an L-shaped positioning plate for guiding the installation of a lockset, as shown in FIG. 1. According to this design, the L-shaped positioning plate 80 has a front hole 82 and a side hole 84. When in use, the L-shaped positioning plate 80 is secured to the door panel 12, and then a hole saw 86 is used to make holes on the door panel 12 corresponding to the front hole 82 and side hole 84 of the L-shaped positioning plate 80. This L-shaped positioning plate 80 does not allow the user to adjust the position of the side hole 84 to fit different door panels having a different thickness.

Further, U.S. Pat. No. 4,280,776 discloses a door lockset mounting tool, entitled "Apparatus for installation of a door lockset." According to this design, the apparatus comprises a drill guide for use during the installation of locksets in doors. The guide has a base body with preferably two recesses formed on the flat faces of opposite sides of the guide. One of the recesses has a flat base for straight-edged doors and the other has a sloped base for beveled-edged doors. An aperture extends through the base body from recess to recess and is centered relative to the recesses so that the flat face serves as a guide for drilling pilot holes on the face of the door, while the recesses selectively serve as self-centerable guides for drilling pilot holes for either straight- or beveled-edged doors. A drift punch can be inserted into the edge pilot hole after the face hole has been made so that upon closing the door and urging the drift punch into the jamb, a mark will be made which is the center of the strike hole. This apparatus is functional; however, the operation procedure of this apparatus is complicated.

SUMMARY OF THE INVENTION

The present invention has been accomplished under the circumstances in view. It is one objective of the present invention to provide a door lockset mounting tool, which can quickly define the center line of different door panels that have a different thickness.

It is another objective of the present invention to provide a door lockset mounting tool, which can define the door lockset mounting hole on different door panels at a different pitch.

To achieve these objectives of the present invention, the door lockset mounting tool comprises a base body, a positioning mechanism and a positioning device. The base body comprises a first plate member and a second plate member fixedly arranged at right angles, a first positioning hole defined in the first plate member, and a second positioning hole defined in the second plate member. The positioning mechanism is movably mounted in the first positioning hole of the base body for defining a first drilling center. The positioning device is mounted in the second positioning hole for defining a second drilling center.

DETAILED DESCRIPTION OF THE INVENTION

Figure 1:
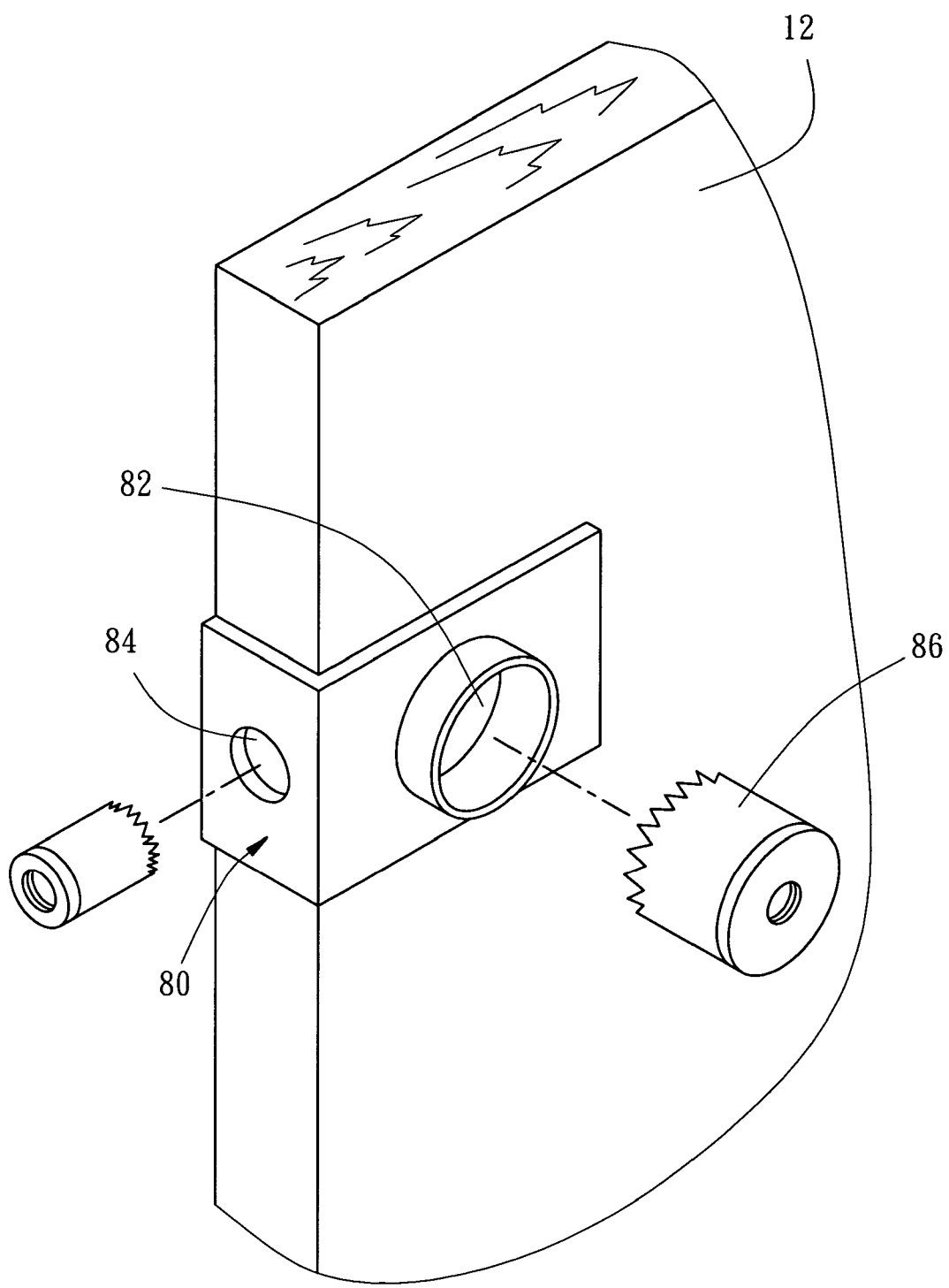
FIG. 1 is a schematic drawing showing the use of an L-shaped positioning plate according to the prior art.
Figure 2:
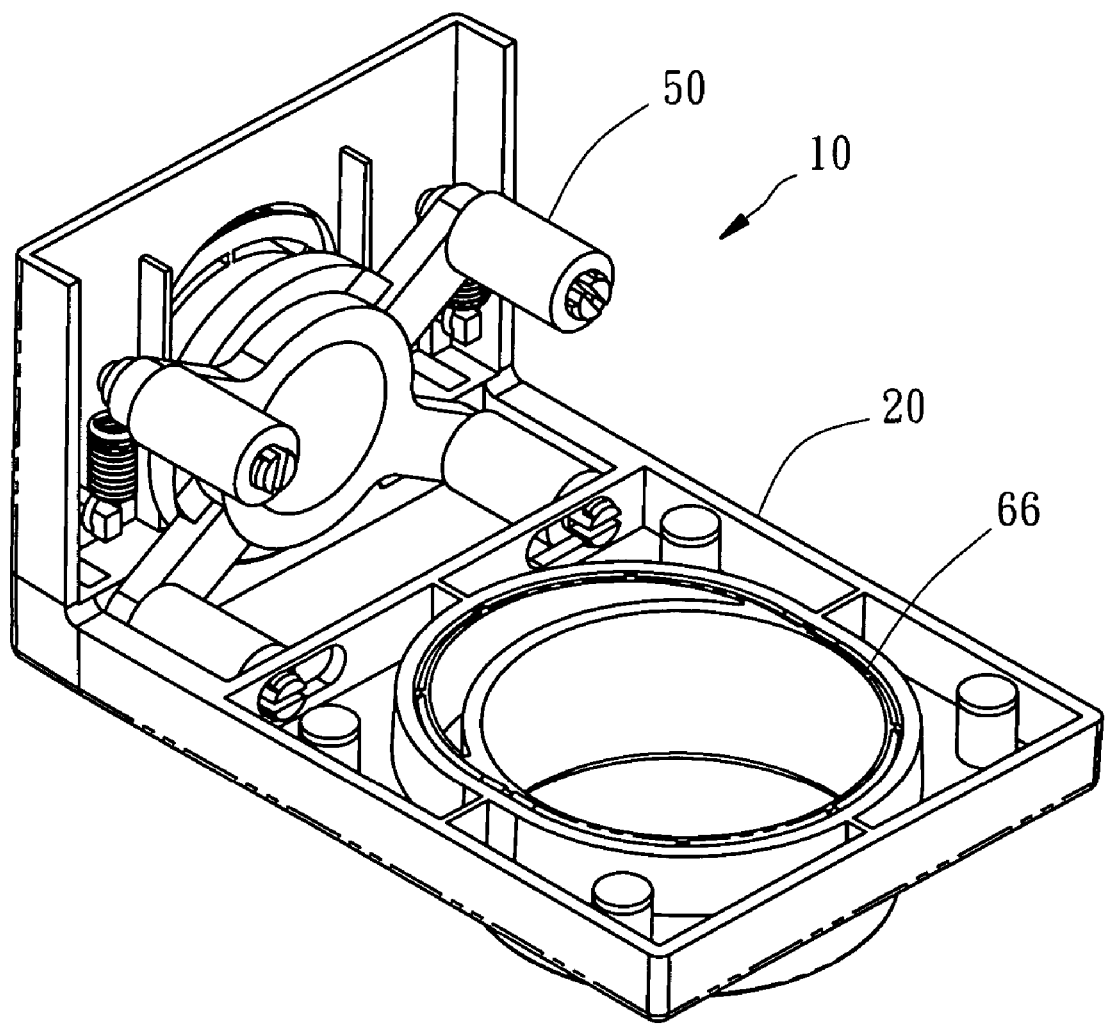
FIG. 2 is a perspective view of a door lockset mounting tool according to a preferred embodiment of the present invention.
Figure 3:
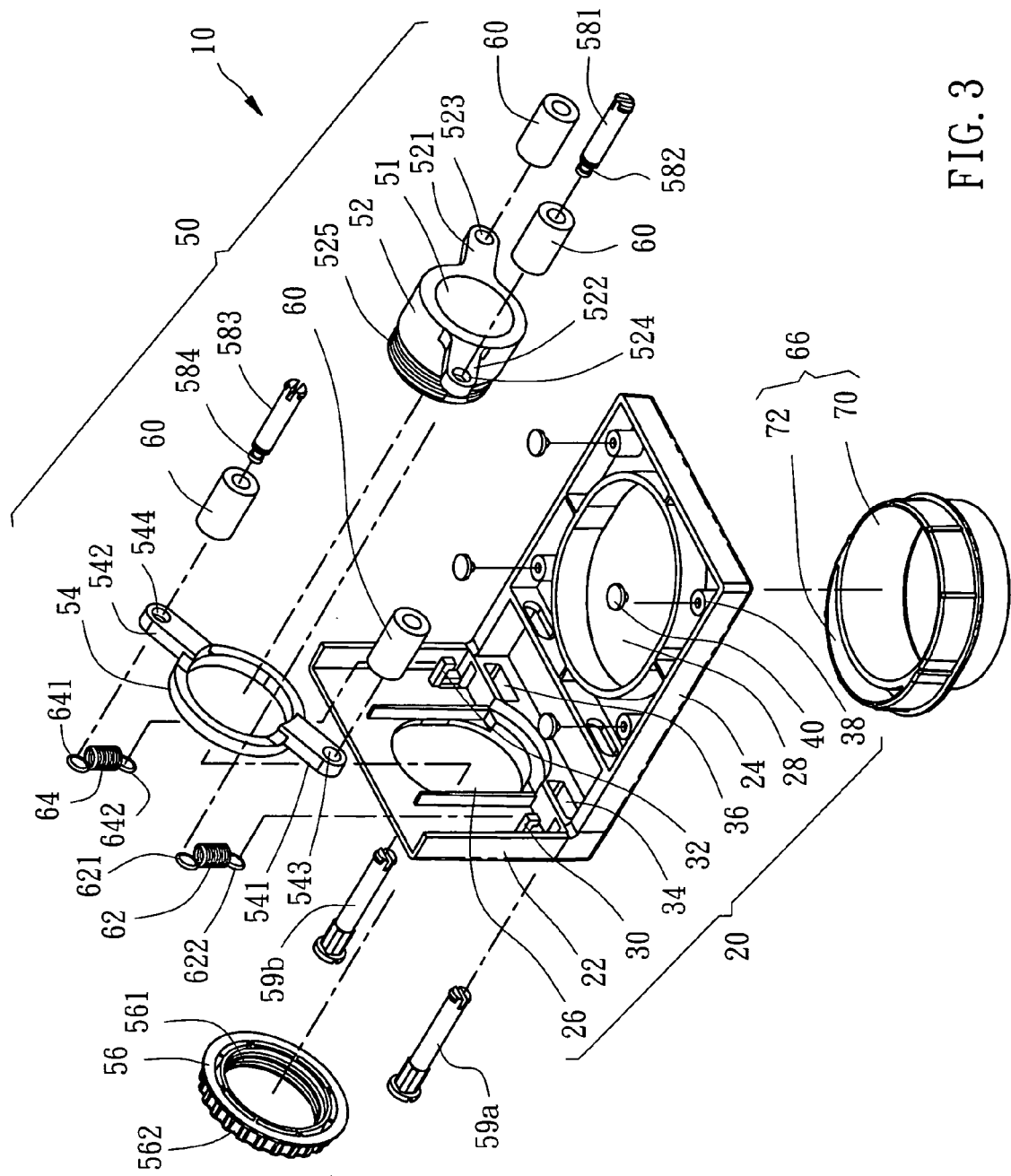
FIG. 3 is an exploded view of the door lockset mounting tool according to the preferred embodiment of the present invention.
Figure 4:
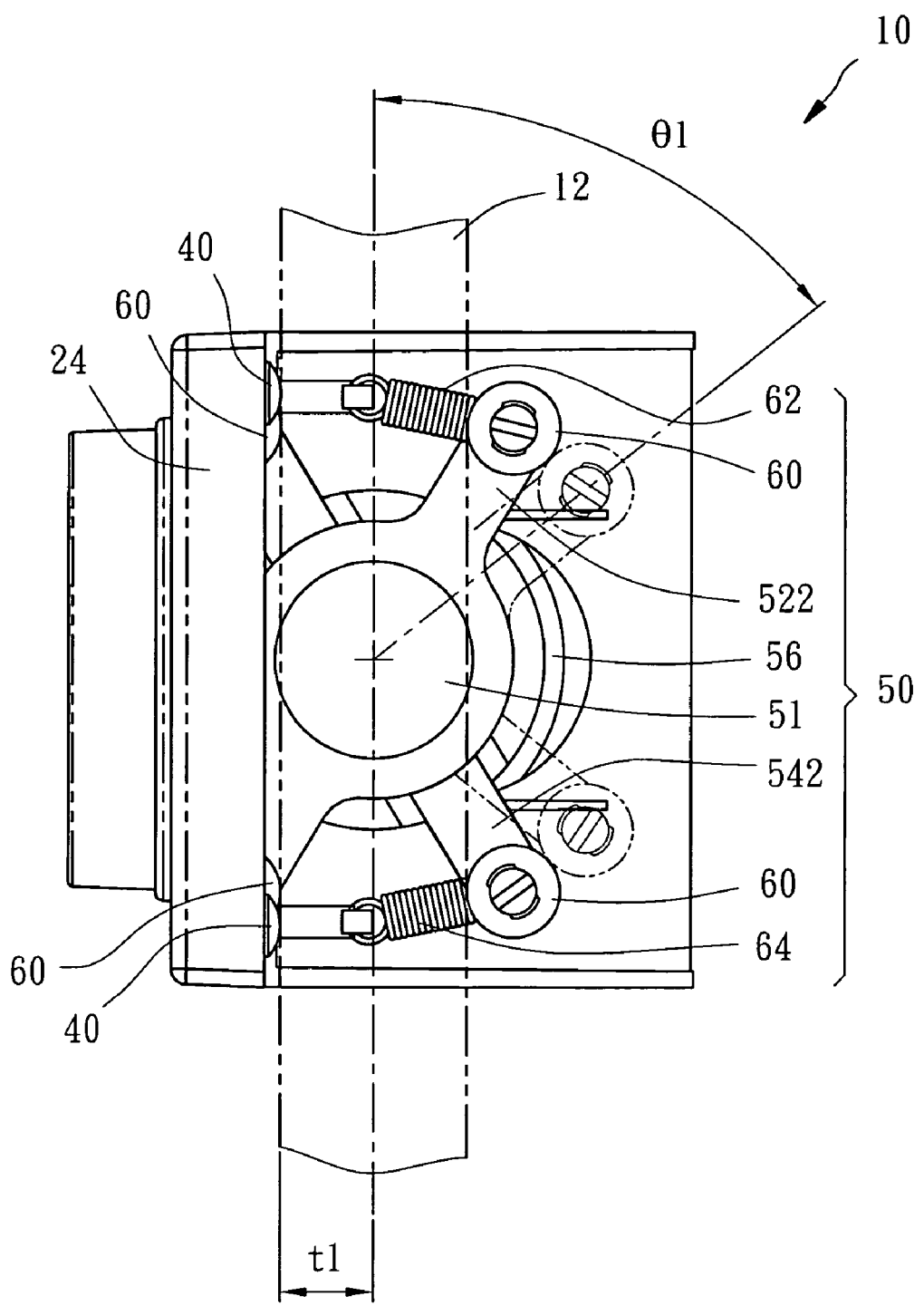
FIG. 4 is a schematic side view of the preferred embodiment of the present invention, showing the positioning mechanism clamped on a relatively thinner door panel.

As shown in FIG. 2-4, a door lockset mounting tool 10 in accordance with the preferred embodiment of the present invention comprises a base body 20, a positioning mechanism 50, and a locating device 66.

The base body 20 comprises a first plate member 22 and a second plate member 24 perpendicularly connected to the first plate member 22, that is, the first plate member 22 has one side perpendicularly connected to one side of the second plate member 24. The first plate member 22 has a positioning hole 26, and two hooks, namely, the first hook 30 and the second hook 32 disposed at two sides relative to the positioning hole 26. The first plate member 22 has two sliding slots, namely, a first sliding slot 34 and a second sliding slot 36 bilaterally disposed adjacent to the second plate member 24. The second plate member 24 has a positioning hole 28, four locating holes 38 equiangularly spaced around the positioning hole 28, and four pads 40 respectively affixed to the locating holes 38.

The positioning mechanism 50 is installed in the base body 20 and comprises a first positioning ring 52, a second positioning ring 54, a lock ring 56, two plug pins 581 and 583, two sliding pins 59a and 59b, four rollers 60, a first spring member 62, and a second spring member 64. The first positioning ring 52 is rotatably and slidably mounted in the positioning hole 26 of the first plate member 22 and provided with two arms, namely, the first arm 521 and the second arm 522 respectively disposed at two opposite sides adjacent to one end thereof and aligned in a line, and an outer thread 525 extending around the periphery at the other end remove from the arms 521 and 522. The arms 521 and 522 each have a round hole 523 or 524 near the respective free end. The second positioning ring 54 is sleeved onto the first positioning ring 52 and provided with two arms, namely, the first arm 541 and the second arm 542 respectively disposed at two opposite sides and aligned in a line. The arms 541 and 542 each have a round hole 543 or 544 near the respective free end. When the first positioning ring 52 and the second positioning ring 54 are coupled together, each two adjacent arms define a contained angle. The lock ring 56 has an inner thread 561 threaded onto the outer thread 525 of the first positioning ring 52, and a plurality of grooves 562 equiangularly spaced around the periphery.

The two plug pins 581 and 583 each have a protruding portion 582 or 584 at one end. The protruding portions 582 and 584 of the plug pins 581 and 583 are respectively inserted into the round hole 524 of the second arm 522 of the first positioning ring 52 and the round hole 544 of the second arm 542 of the second positioning ring 54. The two sliding pins 59a and 59b are respectively inserted through the round hole 543 of the first arm 541 of the second positioning ring 54 and the round hole 523 of the first arm 521 of the first positioning ring 52 and respectively slidably inserted through the first sliding slot 34 and the second sliding slot 36. The rollers 60 are tubular members respectively sleeved onto the plug pins 581 and 583 and the sliding pins 59a and 59b. The first spring member 62 is a compression spring having a first end hook 621 fastened to the protruding portion 582 of one plug pin 581, and a second end hook 622 fastened to the first hook 30 of the first plate member 22. The second spring member 64 is a compression spring having a first end hook 641 fastened to the protruding portion 584 of the other plug pin 583 and a second end hook 642.fastened to the second hook 32 of the first plate member 22.

The locating device 66 is mounted in the positioning hole 28 of the second plate member 24. The locating device 66 has a circular ring 70 and an oval ring 72. The circular ring 70 is formed in the oval ring 72.

Figure 6:
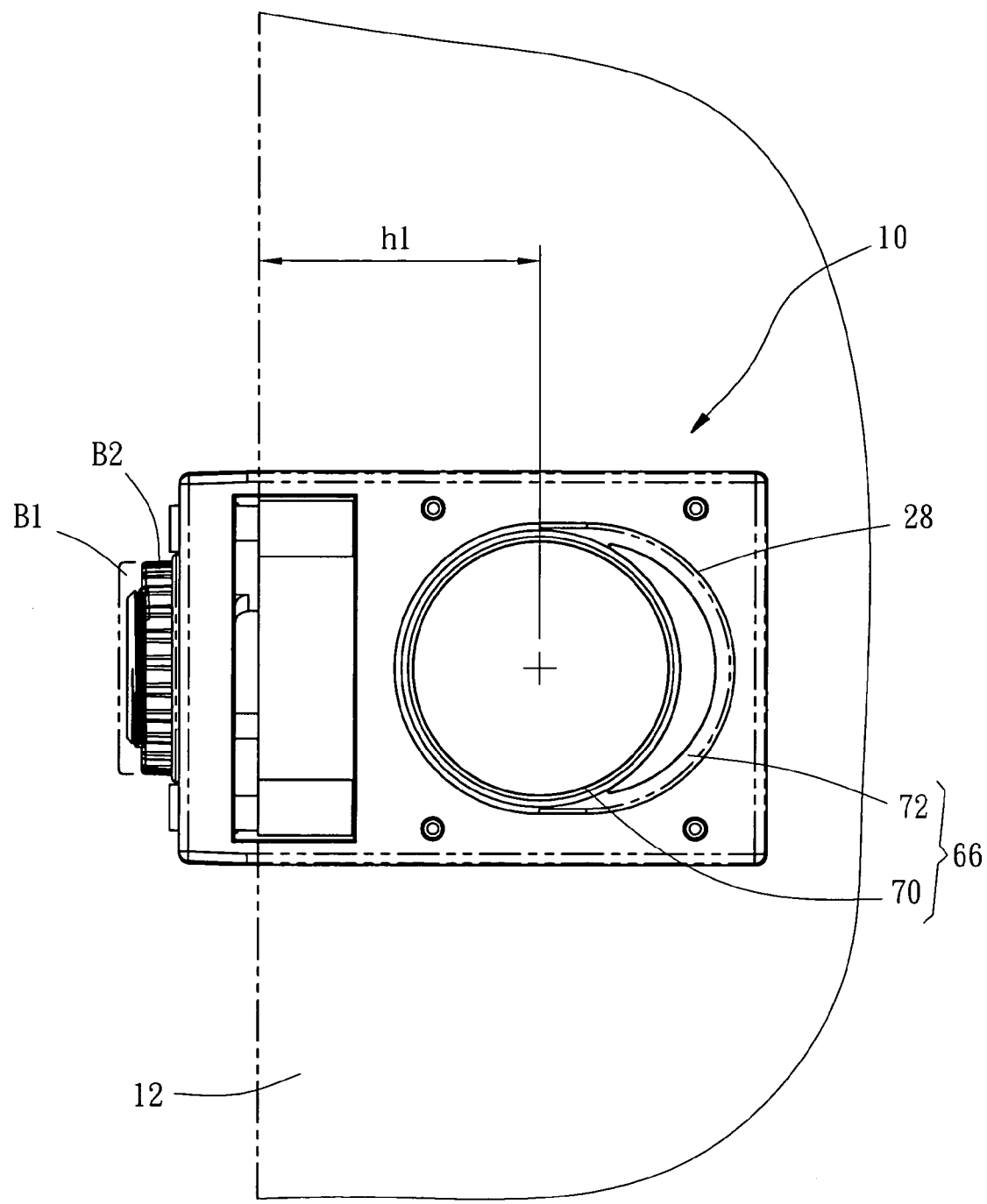
FIG. 6 is a schematic front view of the preferred embodiment of the present invention, showing the circular ring of the positioning device set relatively closer to the side edge of the door panel.

Referring to FIG. 6 and FIGS. 3 and 4 again, when using the door lockset mounting tool 10 in a door panel 12 that is relatively thinner, the pads 40 at the second plate member 24 are stopped against one side of the door panel 12, and then bias the second arm 522 of the first positioning ring 52 and the second arm 542 of the second positioning ring 54 through an angle θ1, and then set the door panel 12 in the positioning mechanism 50. Thereafter, release the hands from the second arm 522 of the first positioning ring 52 and the second arm 542 of the second positioning ring 54, for enabling the arms 522 and 542 to be returned by the respective spring members 62 and 64 and forced to clamp on the door panel 12, keeping the center hole 51 of the first positioning ring 52 on the center of the thickness of the door panel 12. At this time, the distance between the center of the first positioning ring 52 and a side edge of the door panel 12 is defined to be t1. After the positioning mechanism 50 has defined the centerline of the door panel 12, the lock ring 56 is rotated and moved from position B1 to position B2 to lock the first positioning ring 52 and the second positioning ring 54.

Figure 5:
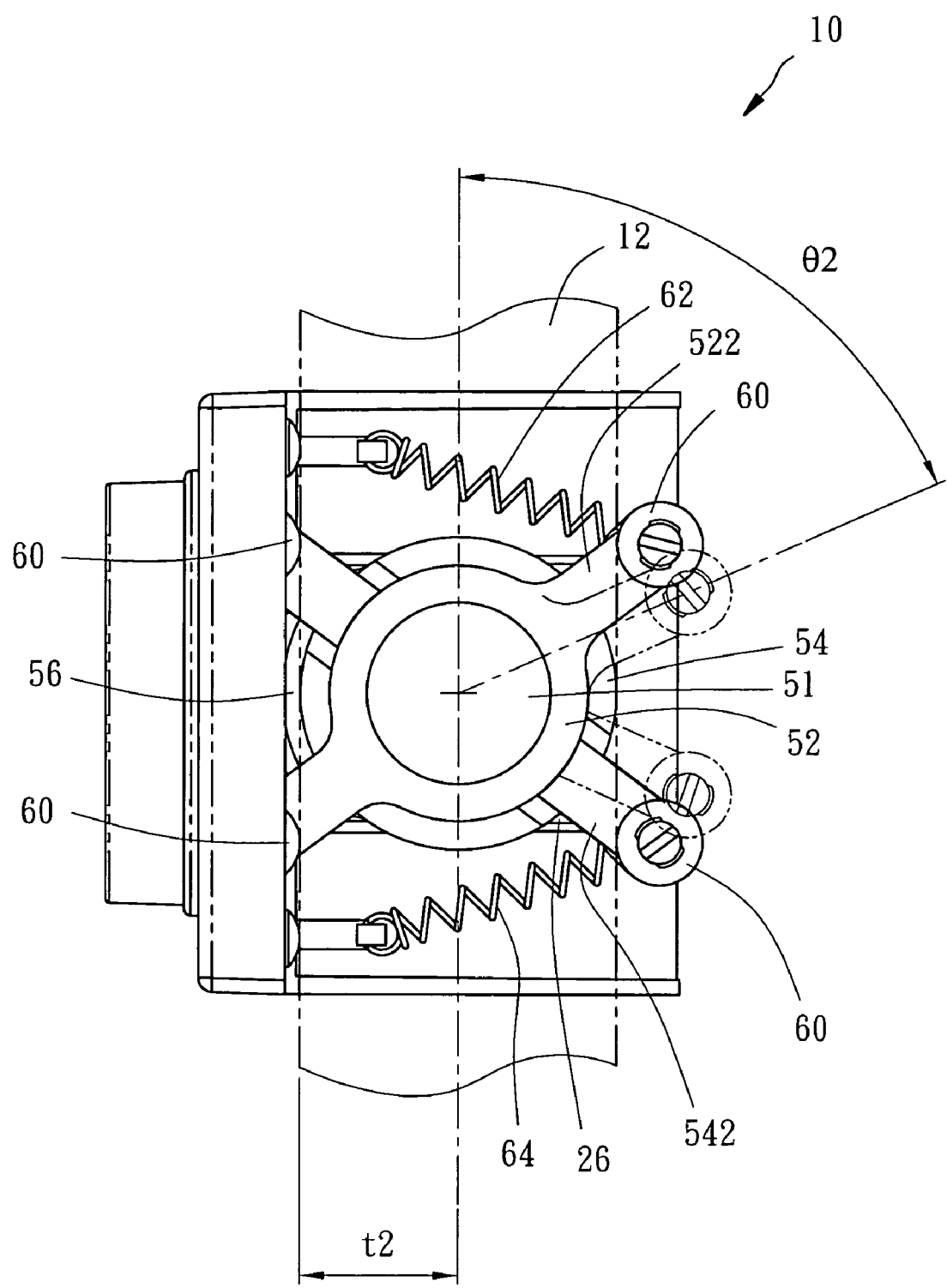
FIG. 5 is another schematic side view of the preferred embodiment of the present invention, showing the positioning mechanism clamped on a relatively thicker door panel.

Referring to FIG. 5, when using the door lockset mounting tool in a door panel 12 that is relatively thicker, the installation procedure is substantially similar to FIG. 4 with the exception that the second arm 522 of the first positioning ring 52 and the second arm 542 of the second positioning ring 54 are biased through a relatively greater angle θ2 than θ1. After the arms 522 and 542 have been biased through angle θ2, the door panel 12 is set in the positioning mechanism 50, and then the hands are released from the arms 522 and 542, for enabling the arms 522 and 542 to be returned by the respective spring members 62 and 64 and forced to clamp on the door panel 12, keeping the center hole 51 of the first positioning ring 52 on the center of the thickness of the door panel 12. At this time, the distance between the center of the first positioning ring 52 and each side of the door panel 12 is defined to be t2. After the positioning mechanism 50 has defined the centerline of the door panel 12, the lock ring 56 is fastened tight to lock the first positioning ring 52 and the second positioning ring 54.

Referring to FIG. 6 again, the when the circular ring 70 of the positioning device 66 is attached to the door panel, the distance between the center of the circular ring 70 and the outer side of the door panel 12 is defined to be h1. Subject to this distance h1, the user can accurately drill the designed hole out of the door panel 12 for door lockset.

Figure 7:
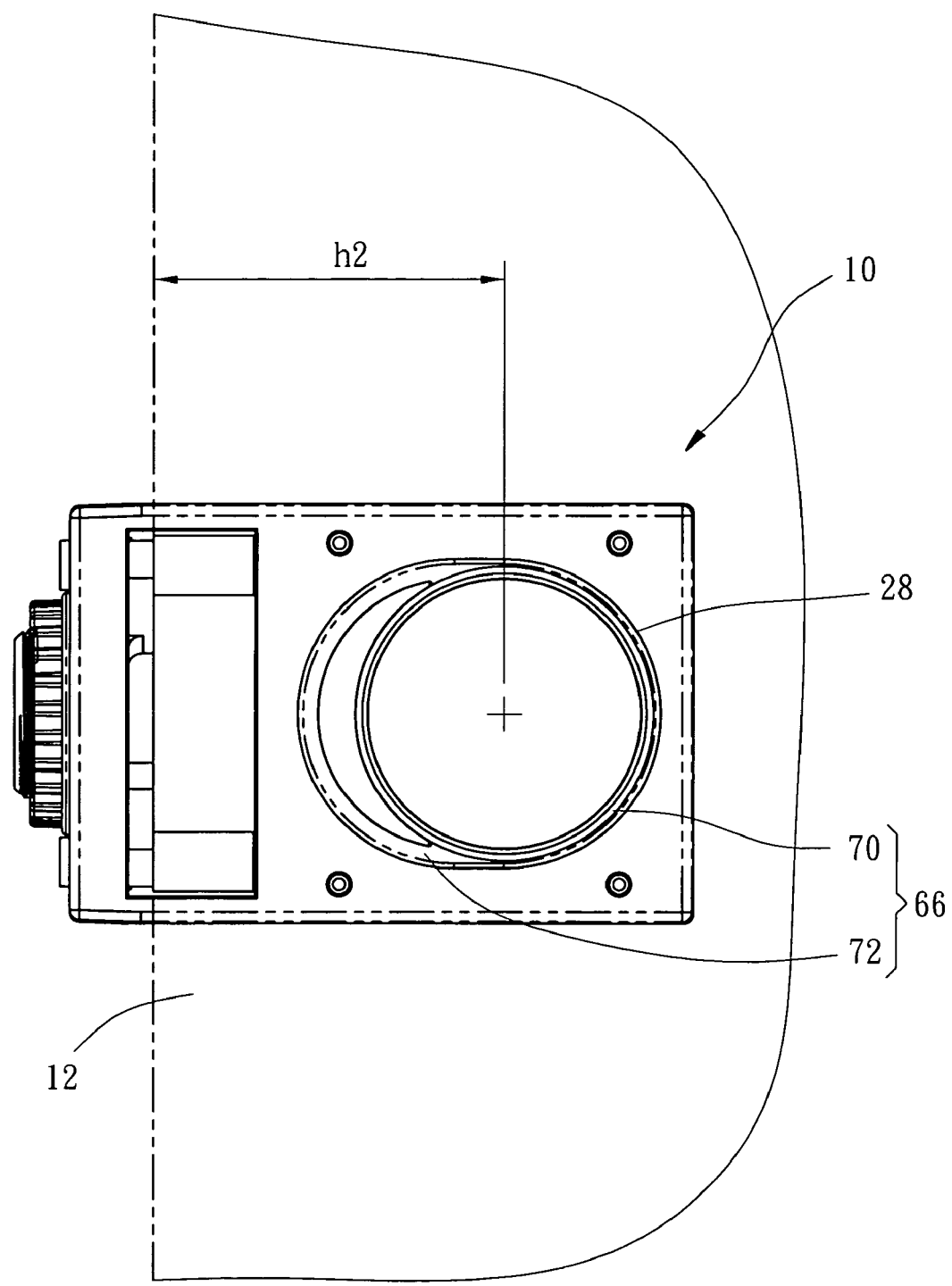
FIG. 7 is another schematic front view of the preferred embodiment of the present invention, showing the circular ring of the positioning device set relatively farther to the side edge of the door panel.

Referring to FIG. 7, the positioning device 66 of the door lockset mounting tool 10 can be rotated through 180 degrees and then set in the positioning hole 28 of the second plate member 24. At this time, the distance between the center of the circular ring 70 and the outer side of the door panel 12 is changed from h1 to h2. The user can then drill the designed hole out of the door panel 12 for door lockset subject to distance h2.

As indicated above, by means of the positioning mechanism 50 and the positioning device 66 of the door lockset mounting tool 10, the user can accurately drill the door lockset hole and the related side hole for latch. Further, the positioning mechanism 50 and the positioning device 66 can be set to fit different door panels having different thickness or different door lockset mounting positions.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A door lockset mounting tool comprising:
a base body having a first plate member, a second plate member fixedly vertically connected to said first plate member; a first positioning hole defined in said first plate member, and a second positioning hole defined in said second plate member;
a positioning mechanism movably mounted in said first positioning hole of said base body for defining a first drilling center; and
a positioning device mounted in said second positioning hole for defining a second drilling center;
wherein said positioning mechanism comprises a first positioning ring mounted in said first positioning hole of said base body, and a second positioning ring sleeved onto said first positioning hole, said first positioning ring and said second positioning ring being respectively rotatable and slidable in said first positioning hole;
wherein said positioning mechanism further comprises a first spring member for returning said first positioning ring each time said first positioning ring is moved relative to said first positioning hole of said base body, said first spring member having a first end fastened to said first plate member of said base body and a second end connected to said first positioning ring, and a second spring member for returning said second positioning ring each time said second positioning ring is moved relative to said first positioning hole of said base body, said second spring member having a first end fastened to said first plate member of said base body and a second end connected to said second positioning ring.

2. The door lockset mounting tool as claimed in claim 1, wherein said first positioning ring and said second positioning rings each have two arms symmetrically disposed at two sides, each arm of said first positioning ring defining with each arm of said second positioning ring a respective contained angle, the two arms of said first positioning ring being respectively mounted with a plug pin and a sliding pin, the two arms of said second positioning ring being respectively mounted with a plug pin and a sliding pin, the plug pins and sliding pins at the arms of said first positioning ring and said second positioning ring being adapted to clamp a door panel.

3. The door lockset mounting tool as claimed in claim 2, wherein the sliding pins at said first positioning ring and said second positioning ring are respectively slidably coupled to said second plate member; the plug pins at said first positioning ring and said second positioning ring are respectively connected to said first spring member and said second spring member.

4. A door lockset mounting tool comprising:
   a base body having a first plate member, a second plate member fixedly vertically connected to said first plate member, a first positioning hole defined in said first plate member, and a second positioning hole defined in said second plate member;
   a positioning mechanism movably mounted in said first positioning hole of said base body for defining a first drilling center; and
   a positioning device mounted in said second positioning hole for defining a second drilling center;
   wherein said positioning mechanism comprises a first positioning ring mounted in said first positioning hole of said base body, and a second positioning ring sleeved onto said first positioning hole, said first positioning ring and said second positioning ring being respectively rotatable and slidable in said first positioning hole;
   wherein said positioning mechanism further comprises a lock member mounted on said first positioning ring for locking said first positioning ring to said first positioning hole of said base body.

5. The door lockset mounting tool as claimed in claim 4, wherein said positioning device further comprises an oval ring mounted in said second positioning hole of said base body, and a circular ring formed in said oval ring.

* * * * *